March 13, 1962 J. G. ROGERS 3,025,433
RELAY BINARY COUNTER
Filed June 1, 1959
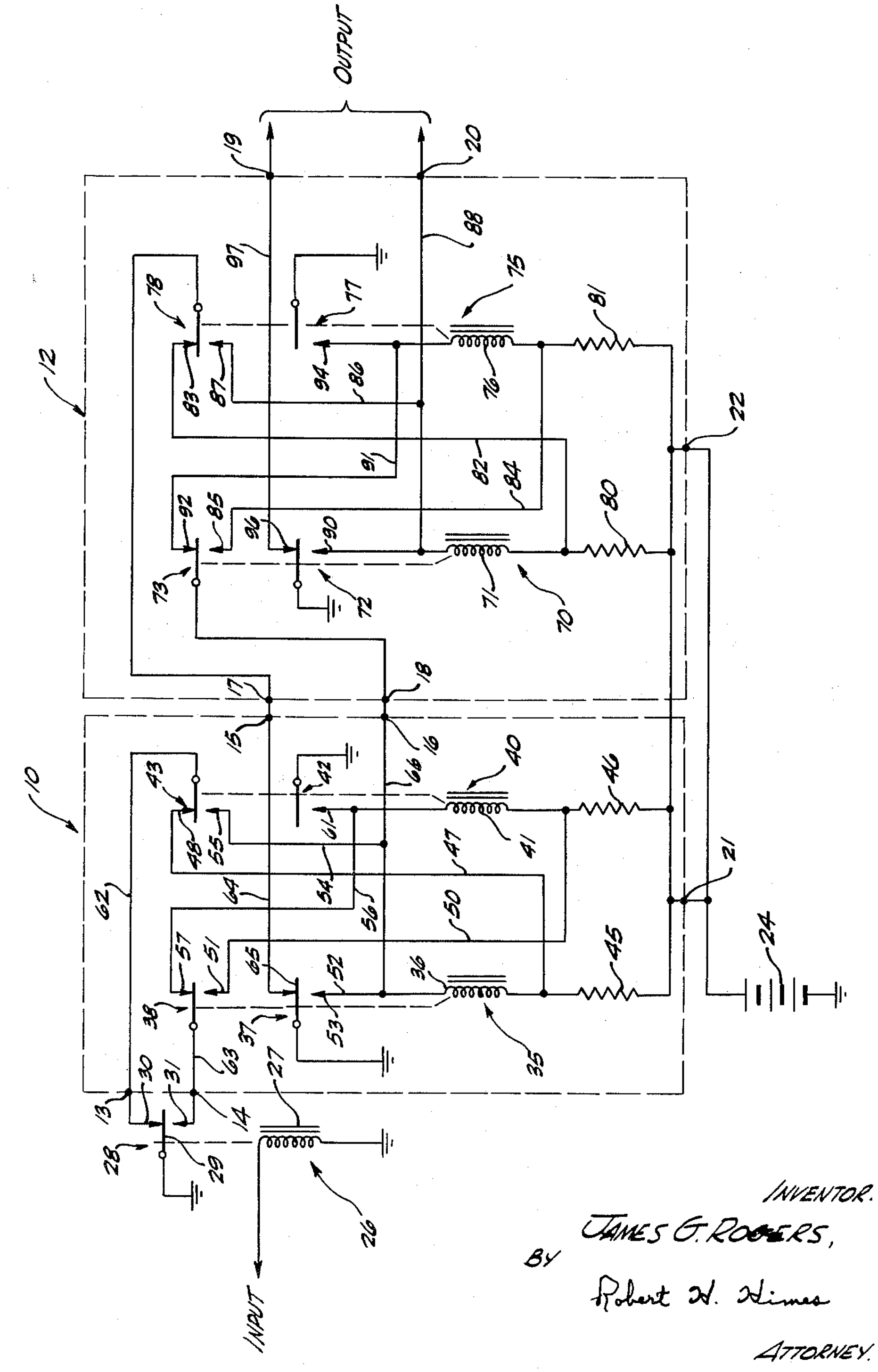
INVENTOR.
JAMES G. ROGERS,
BY Robert W. Himes
ATTORNEY.

United States Patent Office 3,025,433

Patented Mar. 13, 1962

3,025,433
RELAY BINARY COUNTER

James G. Rogers, Fullerton, Calif., assignor to Hughes Aircraft Company, Culver City, Calif., a corporation of Delaware Filed June 1, 1959, Ser. No. 817,329
2 Claims. (Cl. 317—140)

The present invention relates to electro-mechanical apparatus for performing digital computer operations and, more particularly, to binary counting apparatus which employs only two conventional relays for each scale-of-two flip-flop element.

It is generally known that present day types of relay flip-flops require special contact springs or dual windings on the solenoid to ensure a specific make or break sequence of operation. One disadvantage of this type of relay apparatus is the excessive cost of custom-designed relays. Also, in wiring apparatus utilizing custom-designed relays greater care must be exercised in wiring due to the specialization of the various sets of contact springs.

It is therefore an object of the present invention to provide an improved relay binary counter.

Another object of the present invention is to provide an electro-mechanical binary counter incorpoarting only conventional type relays.

Still another object of the invention is to realize a binary or scale-of-two flip-flop element employing only two relays which have no special contact springs to ensure a specific make or break sequence.

In accordance with the present invention, the finite duration or lengths of the pulses to be registered is exploited in a manner to provide isolation between relays whereby the "count" or state of the output relays does not necessarily register a pulse until after its termination.

The above-mentioned and other features and objects of this invention and the manner of obtaining them will become more apparent by reference to the following description taken in conjunction with the accompanying drawing, wherein the only FIGURE illustrates a schematic circuit diagram of two scale-of-two flip-flop elements in cascade to provide a scale-of-four counter.

In the following description, an input is considered "energized" and in one of two stable states when it is maintained at ground potential and "de-energized" and in the remaining stable state when it is floating, i.e., it is not connected to anything on the input side. In the latter case, the potential level assumed by a de-energized input lead will be determined by the characteristics of the circuitry to which it is connected. Referring now to the drawing, there is shown a schematic circuit diagram of an embodiment of the present invention wherein relay flip-flop elements 10, 12 are connected in cascade to provide a scale-of-four counter by way of example. The relay flip-flop element 10 has input terminals 13, 14 and output terminals 15, 16 which are connected respectively to input terminals 17, 18 of relay flip-flop element 12 which, in turn, has output terminals 19, 20. Both of the relay flip-flop elements 10, 12 receive a direct-current voltage at terminals 21, 22, respectively, by means of a connection therefrom to the positive terminal of a battery 24, the negative terminal of which is connected to ground. Battery 24 may provide, for example, a potential level of the order of 28 volts.

Pulse-type information is applied to the relay flip-flop element 10 by means of a relay 26 which includes a solenoid 27 which is responsive, for example, to a sequence of voltage excursions between a potential level representative of binary 1 and a potential level representative of binary 0. The solenoid 27 operates a switch 28 which has an armature 29 that is connected to ground and which is designed so as to either be electrically connected to contacts 30 or 31, which contacts are connected, respectively, to input terminals 13, 14 of the relay flip-flop element 10. It is, of course, apparent that other means such as purely mechanical means may be employed to energize and de-energize the inputs 13, 14 of relay flip-flop element 10. As specified before, it is only necessary that one of the inputs 13, 14 be maintained at ground potential to be considered energized or to remain floating to be considered as de-energized. The inputs 13, 14 should, however, always be in complementary states, i.e., one of the inputs 13 or 14 should be in a state that is opposite that of the remaining input.

The relay flip-flop element 10 comprises a relay 35 which includes a solenoid 36 which operates double contact switches 37 and 38. In addition, relay flip-flop element 10 includes a second relay 40 which has a solenoid 41 which operates a single contact switch 42 and a double contact switch 43. One extremity of each of the solenoids 36, 41 of relays 35, 40, respectively, are connected through resistors 45, 46 to the terminal 21 which, as previously specified, is maintained at a potential level of the order of 28 volts relative to ground. In addition, the junction between solenoid 36 and resistor 45 is connected over a lead 47 to a normally closed contact 48 of switch 43, which switch is a part of relay 40. Similarly, the junction between solenoid 41 and resistor 46 is connected over a lead 50 to a normally open contact 51 of switch 38 which switch is a part of relay 35.

In addition to the above, the remaining extremity of solenoid 36 is connected over a lead 52 to a normally open contact 53 of switch 37 and over a lead 54 to a normally open contact 55 of switch 43. In a similar manner, the remaining extremity of solenoid 41 is connected over a lead 56 to a normally closed contact 57 of switch 38 and to a normally open contact 61 of switch 42. The inputs 13, 14 are connected, respectively, over leads 62, 63 to the armatures of switches 43 and 38. Further, the armatures of switches 37, 42 associated with relays 35, 40, respectively, are both connected to ground. Lastly, output terminals 15, 16 are connected respectively, over a lead 64 to a normally closed contact 65 and over a lead 66 to the normally open contact 53 of switch 37 of the relay 35.

The relay flip-flop element 12 is similar in all respects to the relay flip-flop element 10 and is described in detail to illustrate the manner in which two such elements operate together when connected in cascade. Thus, relay flip-flop element 12 includes a relay 70 which has a solenoid 71 and double contact switches 72 and 73, and a second relay 75 which has a solenoid 76, a single contact normally open switch 77, and a double contact switch 78. Similar to the element 10, one extremity of each of the solenoids 71, 76 are connected through resistors 80, 81, respectively, to the terminal 22 which is maintained at the potential of the order of 28 volts positive with respect to ground by the battery 24. The junction between solenoid 71 and resistor 80 is connected over a lead 82 to a normally closed contact 83 of switch 78, and the junction between solenoid 76 and resistor 81 is connected over a lead 84 to a normally open contact 85 of the switch 73. Also, as in the case of relay flip-flop element 10, the remaining extremity of solenoid 71 is connected over a lead 86 to a normally open contact 87 of switch 78, the armature of which is connected to input terminal 17; over a lead 88 to the output terminal 20; and, in addition, is connected to a normally open contact 90 of switch 72, the armature of which is connected to ground. Also, the remaining extremity of solenoid 76 is connected over a lead 91 to a normally closed contact 92 of switch 73, the armature of which is connected to the input terminal 18; and, in addition, is connected to a normally open contact 94 of switch 77, the armature of which is connected to ground. Lastly, a normally closed contact 96 of switch 72 of relay 70 is connected over a lead 97 to the remaining output terminal 19. As specified above, the internal connections of each of the relay flip-flop elements 10 and 12 are the same. Two elements have been disclosed so that the manner in which one element operates in conjunction with the next adjacent cascaded element may be more clearly described.

In the operation of the relay binary counter of the present invention, it is necessary to consider the operation during the duration of the pulses and also during the time intermediate the termination of one pulse and commencement of the next succeeding pulse. The counter, as shown, is in what is designated as a "de-energized" state. Upon application of the first pulse to solenoid 27 of relay 26, the armature 29 is pulled into contact with contact arm 31, whereby the electrical circuit through solenoid 41 of relay 40 is completed over lead 56 through switch 38 and through lead 63 through switch 28 to ground. Upon energization of the relay 40, the armature of the switch 42 thereof is pulled into electrical contact with contact arm 61 thereby "locking-in" the relay 40. None of the remaining relays 35, 70 and 75 are energized during the duration of the first pulse subsequent to the relays being in the de-energized state.

Upon the termination of the first pulse, armature 29 of switch 28 again returns so as to make electrical contact with contact arm 30, thus connecting lead 62 to ground. The connecting of lead 62 to ground results in the connecting of lead 54 through switch 43 to ground which, in turn, energizes solenoid 36 of relay 35 and solenoid 76 of relay 75. Thus, after application of the first pulse, relays 35, 40 and 75 are energized.

Application of the second pulse to solenoid 27 of relay 26 again connects the armature 29 of switch 28 to contact arm 31 which, in turn, connects the junction between resistor 46 and solenoid 41 to ground through switch 38 to cause the relay 40 to drop out. The remaining relays 35, 70 and 75 do not change state during the application of the second pulse. At the termination of the second pulse, however, the return of armature 29 to make an electrical contact with contact arm 30 of switch 28 connects the junction between solenoid 36 and resistor 45 to ground through switch 43 which causes the relay 35 to drop out. The dropping out of relay 35 connects the input terminal 17 of relay flip-flop element 12 to ground through the switch 37. Maintaining the input terminal 17 at ground energizes the solenoid 71 of relay 70 through the switch 78; energization of the relay 70 causes the armature of switch 72 to come into electrical contact with contact arm 90 thereof thereby to lock-in the relay 70. Thus, at the termination of the second pulse, relays 35 and 40 are in the de-energized state and relays 70 and 75 are both in the energized state.

Upon application of the third pulse, the armature 29 of switch 28 again connects contact arm 31 thereof to ground which, in turn, energizes the solenoid 41 of relay 40 through the switch 38. Energization of relay 40, as before, locks itself in by providing an electrical connection through switch 42 to ground.

After termination of the third pulse, the armature 29 of switch 28 again connects the input 13 of relay flip-flop element 10 to ground. Since relay 40 is now energized, switch 43 now completes the electrical circuit from solenoid 36 to ground thereby energizing relay 35, which relay locks itself in by means of a connection to ground through switch 37 thereof. Energization of relay 35 connects the input terminal 18 of relay flip-flop element 12 to ground which, in turn, connects the junction between resistors 81 and solenoid 76 to ground through the switch 73, thereby causing the relay 75 to drop out. Thus, at the termination of the third pulse relays 35, 40 and 70 are in the energized state and relay 75 is in the de-energized state.

Application of the fourth pulse to the solenoid 27 of relay 26 again connects the contact arm 31 of switch 28 to ground through the armature 29 thereof. This connects the junction between resistor 46 and solenoid 31 to ground through the switch 38, thus causing the relay 40 to drop out. The state of the remaining relays 35, 70, 75 does not change during the duration of the fourth pulse. Termination of the fourth pulse, however, again results in the connecting of the input terminal 13 of relay flip-flop element 10 to ground through switch 28. This has the effect of connecting the junction between resistor 45 and solenoid 36 to ground through the switch 43 causing relay 35 to drop out which, in turn, connects the input terminal 17 of relay flip-flop element 12 to ground through the switch 37 of relay 35. The maintenance of input terminal 17 at ground connects the junction between resistor 80 and solenoid 71 to ground through the switch 78 thereby causing relay 70 to drop out. Thus, at the termination of the fourth input pulse, all of the relays 35, 40, 70 and 75 are in the de-energized state. This completes a complete cycle of operation of the scale-of-four binary counter of the present invention.

As before, if it is assumed that the maintenance at ground potential is representative of binary 1 and disconnecting an input so that it "floats" is representative of binary 0, the following Table I may be made of the binary numbers produced at the outputs 16, 20 of relay flip-flop elements 10, 12, respectively.

*Table I*

| After Termination of Pulse No. | Relay Flip-Flop 12 Output Terminal 20 | Relay Flip-Flop 10 Output Terminal 16 |
|---|---|---|
| 1 | 0 | 1 |
| 2 | 1 | 0 |
| 3 | 1 | 1 |
| 4 | 0 | 0 |

As can be seen from inspection of the above table, the signals representative of binary numbers available at the outputs 20, 16 of the relay flip-flop elements 12, 10, respectively, successively represent the binary numbers equivalent to 1, 2, 3 and 0 in response to four successively applied pulses to the input relay 26. It is, of course, apparent that additional relay flip-flop elements of the disclosed type can be connected in cascade to produce an electro-mechanical counter having a larger capacity. Also, the state of the output terminals 15, 19 are, of course, representative of binary numbers which are complementary to the binary numbers represented by the state of the output terminals 16, 20, respectively.

What is claimed is:

1. An electro-mechanical flip-flop element comprising a first relay having a first solenoid and first and second switches, each of said first and second switches having a movable armature and a normally-closed contact and a normally-open contact, one extremity of said first solenoid being connected to said normally-open contact of said first switch; a second relay having a second solenoid and third and fourth switches, each of said third and fourth switches having a movable armature and a normally-open contact, said fourth switch additionally have a normally-closed contact and one extremity of said second solenoid being connected to said normally-open contact of said third switch; means connected to said first and third switches for maintaining said movable armature thereof at a substantially fixed reference potential; first and second resistors connected from a common junction to the remaining extremities of said first and second solenoids, respectively; means connected to said common junction for maintaining said common junction at a predetermined potential level relative to said substantially fixed reference potential; means for providing an electrical connection from said one extremity of said first solenoid to a first output terminal and to the normally-open contact of said fourth switch; means for providing an electrical connection from said remaining extremity of said first solenoid to said normally-closed contact of said fourth switch; means for providing an electrical connection from said one extremity of said second solenoid to said normally-closed contact of said second switch; means for providing an electrical connection from said remaining extremity of said second solenoid to said normally-open contact of said second switch; means for providing an electrical connection from said normally-closed contact of said first switch to a second output terminal; and means for providing electrical connections from the movable armatures of said second and fourth switches to first and second input terminals, respectively.

2. An electro-mechanical counter comprising first, second, third and fourth relays each having a plurality of switching contacts; means responsive to a first voltage excursion for energizing said second relay through a first normally-closed switching contact of said first relay; means including first normally-open switching contacts of said second relay for locking-in said second relay; means responsive to the termination of said first voltage excursion for energizing said first relay through a second normally-open switching contact of said second relay and for energizing said fourth relay through said second normally-open switching contact of said second relay and through a first normally-closed switching contact of said third relay; means including a first normally-open switching contact of said first relay and a first normally-open switching contact of said fourth relay for locking-in said first and fourth relays; means responsive to a second voltage excursion subsequent to the termination of said first voltage excursion for short-circuiting the excitation of said second relay through a second normally-open switching contact of said first relay thereby dropping out said second relay; means responsive to the termination of said second voltage excursion for short-circuiting the excitation of said first relay through a first normally-closed switching contact of said second relay thereby dropping-out said first relay and for applying excitation to said third relay through a second normally-closed switching contact of said first relay and a second normally-open switching contact of said fourth relay; means including a first normally-open switching contact of said third relay for locking-in said third relay; means responsive to a third voltage excursion subsequent to the termination of said second voltage excursion for energizing said second relay through said first normally-closed switching contact of said first relay; means responsive to the termination of said third voltage excursion for energizing said first relay through said second normally-open switching contact of said second relay and for short-circuiting the excitation of said fourth relay through said first normally-open switching contact of said first relay through a second normally-open switching contact of said third relay; means responsive to a fourth voltage excursion subsequent to the termination of said third voltage excursion for short-circuiting the excitation of said second relay through said second normally-open switching contact of said first relay thereby dropping out said second relay; and means responsive to the termination of said fourth voltage excursion for short-circuiting the excitation of said first relay through said first normally-closed switching contact of said second relay and for short-circuiting the excitation of said third relay through a second normally-closed switching contact of said first relay and a first normally-closed switching contact of said fourth relay thereby dropping out said first and third relays whereby the successive states of energization and de-energization of said first and third relays constitutes a binary representation of the number of completed voltage excursions.

References Cited in the file of this patent

UNITED STATES PATENTS

| | | |
|---|---|---|
| 1,751,263 | Cesareo | Mar. 18, 1930 |
| 2,561,073 | Schouten | July 17, 1951 |
| 2,814,003 | Alizon | Nov. 19, 1957 |